United States Patent
Haley et al.

(10) Patent No.: US 6,521,674 B1
(45) Date of Patent: Feb. 18, 2003

(54) LATEX-LIKE FLEXIBLE POLYURETHANE FOAM AND PROCESS FOR MAKING SAME

(75) Inventors: David L. Haley, Chester, VA (US); Tedd W. Wishneski, Midlothian, VA (US)

(73) Assignee: Carpenter Co., Richmond, VA (US)

( * ) Notice: Subject to any disclaimer, the term of this patent is extended or adjusted under 35 U.S.C. 154(b) by 0 days.

(21) Appl. No.: 08/130,517

(22) Filed: Oct. 1, 1993

(51) Int. Cl.[7] .............................. C08J 9/08; C08J 9/14; C08L 75/08
(52) U.S. Cl. ................ 521/137; 521/131; 521/174; 521/914
(58) Field of Search ................ 521/131, 137, 521/174, 914

(56) References Cited

U.S. PATENT DOCUMENTS

| | | | |
|---|---|---|---|
| 3,405,077 A | 10/1968 | Pastor et al. | 521/116 |
| 3,546,145 A | 12/1970 | Granger et al. | 521/174 |
| 3,857,800 A | 12/1974 | Fishbein et al. | 521/174 |
| 3,869,413 A * | 3/1975 | Blankenship | 521/137 |
| 4,104,236 A * | 8/1978 | Simroth | 521/137 |
| 4,111,865 A * | 9/1978 | Seefried, Jr. et al. | 521/137 |
| 4,144,386 A | 3/1979 | Consoli et al. | 521/167 |
| 4,148,840 A * | 4/1979 | Shah | 521/137 |
| 4,214,055 A * | 7/1980 | Seefried, Jr. et al. | 521/137 |
| 4,282,331 A | 8/1981 | Priest | 521/137 |
| 4,559,366 A * | 12/1985 | Hostettler | 521/137 |
| 4,596,665 A | 6/1986 | Gonzalez et al. | 521/167 |
| 4,652,589 A * | 3/1987 | Simroth et al. | 521/137 |
| 4,837,247 A | 6/1989 | Gastinger et al. | 521/137 |
| 4,883,825 A | 11/1989 | Westfall et al. | 521/112 |
| 4,929,646 A | 5/1990 | Nichols et al. | 521/137 |
| 4,950,694 A | 8/1990 | Hager | 521/167 |
| 4,981,880 A | 1/1991 | Lehmann et al. | 521/174 |
| 5,011,908 A | 4/1991 | Hager | 521/174 |
| 5,063,253 A | 11/1991 | Gansen et al. | 521/159 |
| 5,128,381 A | 7/1992 | Tane et al. | 521/117 |
| 5,171,759 A | 12/1992 | Hager | 521/174 |

* cited by examiner

*Primary Examiner*—Rabon Sergent
(74) *Attorney, Agent, or Firm*—Smith, Gambrell & Russell, LLP

(57) ABSTRACT

A flexible, latex-like polyurethane foam having the "feel" and comfort of a latex foam and an Indentation Force Deflection (25% IFD as low as 3 lbs.) and the method of making such foam by reacting a mixture of triol polyether polyols, namely, a) a major proportion of a triol polyol having a hydroxyl content of about 50–80%, a 10–25% ethylene oxide cap and a molecular weight of about 3,000–6,500, (b) a minor proportion of a polymer triol polyol, preferably SAN polyol, having a molecular weight of about 3,000–6,5000; and (c) a very minor amount of a triol polyol having a primary hydroxyl content of at least 50% and about 40–90% ethylene oxide cap and a molecular weight of from 1,000–6,000. The polyol mixture is reacted with a MDI isocyanate in the presence of a critical amount of from about 1.5 to about 3.5 parts by weight of water, an auxiliary blowing agent and an amine catalyst. The IFD or stiffness value of the foam is increased by decreasing the amount of auxiliary blowing agent used and the resulting latex-like foam still maintains the "feel" and comfort of a latex foam.

6 Claims, No Drawings

LATEX-LIKE FLEXIBLE POLYURETHANE FOAM AND PROCESS FOR MAKING SAME

The parent invention relates to a new, novel flexible polyurethane foam having the feel and comfort properties of latex foam and which is suitable for cushioning because of its unique softness and to a method of making such foam utilizing a new combination of polyether polyols. The foam of the invention has an Indentation Force Deflection (25% IFD) as low as 3 lbs.

THE PRIOR ART

Attempts have been made in the prior art to produce soft, flexible foams, but none of these foams achieves the "feel" and comfort of latex foam in which the 25% IFD is as low as 3 lbs.

The Pastor, et al. U.S. Pat. No. 3,405,077 discloses a process for making polyurethane foams having improved softness, flexibility and hand, wherein a known polyether polyol has incorporated therein from 1.8 to 5 parts of water by weight and a mono-, di- or trihydric alcohol. The mixture is reacted with a polyisocyanate in the presence of a volatile alkane as blowing agent. In the Table at the top of column 4, Foam A is disclosed as having an IFD 25% value of 16 and is described as an "unusually soft, open-cell porous, flexible polyether urethane foam having a low IFD value."

The Westfall, et al. U.S. Pat. No. 4,883,825 discloses a process for making low density, flexible polyurethane foams. As set forth in column 2, beginning with line 45, such foams, having a density of 1 to 2 pounds per cubic foot, are formed by the reaction of (1) high reactivity, high ethylene oxide, high functionality polyols, (2) hydrophilic polyhydric compounds, (3) water above 4.0 parts per hundred parts and (4) organic polyisocyanates. The polyisocyanates used in the Tables have an index of from 100 (Tables IV, V and VII–X) to 110 (Table VI). IFD values are only set forth in Table X and they are 25 and 45. The patentee is not seeking to form foams having IFD values comparable to those of latex foam.

The Nichols, et al. U.S. Pat. No. 4,929,646 discloses polyurethane foams made using high molecular weight (at least 5,000) high functionality poly(oxyethylene) compounds (at least 50 weight percent oxyethylene units) as cell openers, which are effective in softening foams made using MDI-based polyisocyanates. As set forth in column 6, when the polyisocyanate is MDI, it should have an average functionality of 1.5 to about 2.2 (column 7, lines 5–22). The isocyanate index for MDI is from 60–100 with 70–103 being more preferred. Highly resilient foams are formed at indices as low as about 60. (See column 7, lines 48–56.) The IFD values are set forth and compared in Table V. While the patents state at the top of column 13 that excellent improvement in cell opening is obtained along with a desirable softening of the foam, as indicated by decreasing IFD values, such values in Table V appear to be very high.

The Hager, U.S. Pat. No. 4,950,694 discloses the preparation of low density, low resilience, soft, flexible polyurethane foams having a substantially open cell structure by reacting a conventional hydroxyl-containing polyether polyol with a polyisocyanate having an isocyanate index of between 60 and 94. The patent uses a foam processing aid to stabilize the foam to allow processing the foam substantially free of inert blowing agents. The foam processing aid is a combination of a cross-linker and a cell opener. This technology is known in the industry for reducing or eliminating auxiliary blowing agents. High resiliency foams are discussed in column 2, and they are usually produced using high ethylene oxide content polyols having equivalent weights above about 1,600 and primary hydroxyl contents of about 50% (column 2, lines 43–46). The foams have a 25% IFD value of less than 35, preferably below about 25 and more preferably below about 20 lbs. per 50 square inches (column 5, lines 10–14). IFD values are shown in the Tables for the respective polyurethanes, but none are under 11 and almost all are between 11 and 20.

The Consoli U.S. Pat. No. 4,144,386 discloses a method of producing flexible polyurethane foams having allegedly excellent softness by the reaction of a polyhydroxyl containing polyether, described in column 2 beginning with line 15, with a polyisocyanate which is the product of the partial polymerization of toluene diisocyanate and polyhydroxyl containing polyether. The molar ratio of isocyanate groups to hydroxyl groups is equal to or greater than 1 and preferably between 1:1 to 1.15:1. The load bearing capacity $K_g/322$ cm$^2$, at 25% is 2.8–6.3 in Table 1 (column 4) and from 2.5–5.4 in Table 2 (column 5).

The Lehmann U.S. Pat. No. 4,981,880 discloses a method of making low density, soft, flexible polyurethane foams by reacting polyisocyanate with a polyol composition containing at least two different hydroxyl-containing compounds in the presence of a trimerization catalyst and a blowing agent. At least one of the hydroxyl compounds is a polyol of hydroxyl number from 20 to 120 and at least one hydroxy compound is a polyether mono-alcohol. The latter polyol is present in an amount sufficient to provide measurably softer foams (column 4, line 9–12). As stated in column 7, lines 11–19, increasing amounts of trimerization catalyst provide for softer foam exhibiting lower compressive load deflection. Alkanes, and particularly pentane, are disclosed as supplementary blowing agents (column 7, lines 62–64). The properties of the foams are set forth in Tables 2 and 4 (column 11).

Hager, in his U.S. Pat. No. 5,011,908, states that prior to his invention of low density (less than about 1.8 pcf) and/or low load (less than 20 pounds/50 square inch), the production of high resiliency foam had been limited (column 1, line 59 to column 2, line 4). Also, production of such foams required the use of halocarbons (column 3, lines 11–15). Hager also states that all commercially useful systems for producing high resilience foam rely on polymer polyols and omission of such polymer polyols results in severe shrinkage (column 2, lines 42–55). Hager's invention utilizes a polymer polyol composition containing (1) a high functionality polyol, (2) a subsidiary poly (alkylene oxide) high in poly (oxyethylene) content, and (3) a stably dispersed polymer (column 3, lines 60–65). The latter polymer can be standard vinyl polymer or copolymer, a polyurea-type polymer or a condensation product of a polyfunctional low molecular weight glycol or glycol amine with a diisocyanate (column 5, lines 26–35). The isocyanate index is from about 100 to 115 (column 8, lines 55–57). The IFD values set forth in the several tables, at 25% load, are greater than 12. The patent focuses on modifying the polymer polyol to provide stable, non-shrinking, free-rise foam with high water levels, but requires the use of cross-linkers to achieve this end.

It is also known in the art to react a mixture of known polyols (Arcol Polyol 1280, 4,000 M.W. and Arcol Polyol 1230, 4,500 M.W.), namely, polyoxypropylene/polyoxyethylene triols with TDI (toluene diisocyanate) having an isocyanate index value of less than 50 to produce a supersoft foam of about 6 lbs. IFD. However, the resulting foam does not possess the "feel" associated with a latex foam and is not a latex-like polyurethane foam.

SUMMARY OF THE INVENTION

The novel flexible polyurethane foam of the invention having latex-like properties of "feel" and comfort is formed by reacting a mixture of polyether polyols consisting essentially of (a) a major proportion of a triol polyol having a primary hydroxyl content of about 50–80% with about a 10–25% ethylene oxide cap and a molecular weight (M.W.) of about 3,000–6,500, (b) a minor proportion of a grafted polymer triol polyol having about 3,000–6,500 M.W. and (c) a very minor amount of a triol polyol having a primary hydroxyl content of at least about 50% and about 40–90% ethylene oxide cap, and reacting the triol polyol mixture with an isocyanate having a functionality within the range of about 2.0–2.7 and an Isocyanate Index of about 75–100. The reaction takes place in the presence of a critical amount of water and an auxiliary blowing agent.

DETAILED DESCRIPTION OF THE INVENTION

A principal object of the present invention is to produce a flexible polyurethane foam having the "feel," comfort and properties of latex foam. Latex foam has dominated the foam pillow market for many years due to its unique softness and overall "feel." Firmness values for latex foam can be as low as 3 lbs. IFD, but existing technology for polyurethanes that approach the unique "feel" of latex, i.e., high resilient polyurethanes, can only be produced at IFD values which are not as low as those of latex foam. The present invention allows one to reach 3 lbs. IFD for the polyurethane foam without losing the "feel" and comfort of latex foam.

Another object of the invention is to produce polyurethane foams having a full range of hardness values while still possessing latex-like properties.

The following Table sets forth a preferred formulation used to produce foams of the present invention:

TABLE I

| Ingredient | Parts by Weight |
| --- | --- |
| Polyol No. 1 | 80 |
| Polyol No. 2 | 20 |
| Polyol No. 3 | 2 |
| Organic-Silicone Surfactant (Union Carbide Y10184) | 3 |
| Water | 2.25 |
| Amine Catalyst (Air Products Dabco 33LV) | 0.375 |
| Amine Catalyst (Union Carbide Niax A-1) | 0.05 |
| Pentane | 15 |
| Polymeric MDI (diphenyl methane diisocyanate) (BASF M-10) | 32.5 |
| Isocyanate Index $\left(\frac{NCO}{OH} \text{ ratio}\right)$ | 0.80 |

Polyol No. 1 is Carpol GP6500 manufactured by Carpenter Chemical Company and is an about 6,000 M.W. glycerine-based polyol having a high primary hydroxyl content of about 75% and with about a 15% ethylene oxide cap.

Polyol No. 2 is Arcol 34-28, an acrylonitrile-styrene grafted triol polyol (SAN polyol). It contains 22.5 percent polymer and has a hydroxyl number of 28. The base polyol is an ethylene oxide capped triol and has a high primary hydroxyl content.

Polyol No. 3 is Poly-G83-34 manufactured by Olin Corporation and is an about 3,500 M.W. glycerine-based polyol having a high primary hydroxyl content of about 60% and with about 70% ethylene oxide, which polyol is present as a "cell opener."

The polymeric MDI (diphenyl methane diisocyanate), BASF M-10, has a functionality of about 2.2, and an NCO content of about 32%.

The formulation of Table I produces a polyurethane foam which is latex-like, i.e., has the "feel" and comfort of latex foam, and has a 3 IFD hardness. It is suitable for use as pillows.

By changing certain components of the formulation, the IFD values of the resulting foams can be increased. Table II illustrates the changes in the formulation of Table I, set forth in Examples 2–5, and the IFD values which are obtained:

TABLE II

| Ingredients | Ex. 2 | Ex. 3 | Ex. 4 | Ex. 5 |
| --- | --- | --- | --- | --- |
| | (Parts by Weight) | | | |
| Polyol No. 1 | 80 | 80 | 80 | 80 |
| Polyol No. 2 | 20 | 20 | 20 | 20 |
| Polyol No. 3 | 2 | 2 | 2 | 2 |
| Surfactant (Y10184) | 3 | 3 | 3 | 3 |
| Water | 2.25 | 2.25 | 2.25 | 2.25 |
| Amine Catalyst (Dabco 33LV) | 0.75 | 0.75 | 0.75 | 0.60 |
| Amine Catalyst (A-1) | 0.125 | 0.10 | 0.10 | 0.10 |
| Pentane | 10 | 5 | 5 | 2.5 |
| MDI Isocyanate (Lupranate M-10) | 32.5 | 32.5 | 38.6 | 38.6 |
| Isocyanate Index $\left(\frac{NCO}{OH} \text{ ratio}\right)$ | 0.80 | 0.80 | 0.95 | 0.95 |
| 25% IFD[1] | 5 | 11 | 18 | 24 |

[1]IFD 25%-Indentation Force Deflection (ASTM D-3574, Test B$_1$).
IFD 25% is the load (indentation force deflection) at 25% compression in lbs. per 50 sq. inches.
IFD is the measure of a foam's firmness.

The foams of Tables I and II are made by simultaneously but separately introducing each of the ingredients into a paddle type mixing chamber wherein the isocyanate was mixed with and reacted with the mixture of polyols formed in the mixing chamber in the presence of the other ingredients of the formulation, as set forth above. While the foregoing method is suitable for producing free-rising slab-stock foam and can also be used in forming the polyurethane foam in molds, it is to be understood that blends of one or more of the polyols containing one or more of the other ingredients can be introduced into the reaction chamber through a single conduit while the isocyanate and the remaining ingredients can be introduced into the reaction chamber through one or more additional conduits. Knowing the formulation of the invention, those skilled in the art can readily make the latex-like foam of the invention by any of the known methods for making polyurethane foam.

As can be appreciated from Table II, a decrease in the amount of the pentane blowing agent results in an increase in the IFD values of the foams. Thus, it is possible to obtain latex-like polyurethane foams having the "feel" and comfort of latex foam, wherein the IFD values can be increased while the resulting foams retain their latex-like properties. The increase in hardness to about 40 IFD value permits the use of these latex-like polyurethane foams for mattresses, furniture cushions, bedding, etc. The latex-like polyurethane foams with lower IFD values, i.e., those as low as about 3 IFD, are suitable for bed pillows since they are as soft as the soft latex foam used in pillows for sleeping and have the "feel" and comfort of such latex-foam.

Table III sets forth various properties of the foams of Examples 1–5 compared with latex foam.

TABLE III

| Examples of Invention | Density (pcf) | 25% IFD (15 × 15 × 4) | SAG Factor | Hysteresis Loss (%) | Resilience (%) | Tensile (psl) | Tear (ppl) |
|---|---|---|---|---|---|---|---|
| 1 | 1.6 | 3 | 2.7 | 14 | 45 | 2 | 0.1 |
| 2 | 1.9 | 5 | 2.7 | 13 | 55 | 4 | 0.2 |
| 3 | 2.7 | 11 | 2.7 | 13 | 55 | 4 | 0.3 |
| 4 | 2.5 | 18 | 2.5 | 14 | 60 | 5 | 0.4 |
| 5 | 2.9 | 24 | 2.5 | 12 | 60 | 7 | 0.3 |
| Latex Foam Pillows | | | | | | | |
| Soft | 1.5 | 3 | 2.6 | 16 | 45 | 2 | 0.4 |
| Medium | 1.9 | 5 | 2.4 | 16 | 55 | 3 | 0.3 |
| Hard | 2.0 | 6 | 2.3 | 19 | 55 | 2 | 0.3 |

Similar low IFD values can be obtained when Polyol No. 1 is a 3,000–6,500 M.W. glycerine-based or trimethylolpropane-based polyol having about a 10–25% ethylene oxide cap.

It is preferable to utilize such polyol having a molecular weight of 4,500–6,000, an end cap of 10–25% ethylene oxide and a 50–80% primary hydroxyl content. Such polyol can be present in an amount of about 70 to about 90 parts by weight, and preferably about 75 to about 85 parts by weight. Suitable commercially available polyols which can be used as Polyol No. 1 in the formulation include Carpol GP 6500 and GP 5015 of Carpenter Chemical Company, Pluracol 220 and 380 of BASF, Poly G 85-36 and 85-37 of Olin Corporation, Thanol SF 5505 of Eastman Chemical Co., Desmophen 3901, of Miles, Inc. and Voranol CP 4701 of Dow Chemical Company.

Polyol No. 2 is a 3,000–6,500 M.W. grafted polymer polyol having the same base as Polyol No. 1, but having nominally 15–30% by weight acrylonitrile and/or styrene grafted onto the molecule. Such a polyol can be present in an amount of from about 10 to about 30 parts by weight, and preferably in an amount of about 15 to about 25 parts by weight. Such a polyol has a dispersion of a polymer in a continuous polyol phase, known as a polymer polyol in the industry. The dispersed polymer can be a polymer of one or more ethylenically unsaturated monomers, an epoxy resin, a polyurethane or a polyurea. Dispersions of styrene and/or acrylonitrile polymer and copolymers (SAN), polyurea dispersions (PHD polyols) and polyurea-polyurethane dispersions (PIPA polyols) are suitable for use in the present invention. Suitable polyols, in addition to the styrene-acrylonitrile polymer polyol (SAN), include PIPA (poly isocyanate poly addition) and PHD (Polyharnstoff dispersion). Examples of certain SAN, PIPA and PHD polyols are Carpol P 150 of Carpenter Chemical Company, Pluracol 994, 1001, 1002 and 1003 of BASF, Poly G 92-27 of Olin Corporation; Arcol 34-28 and 31-28 of Arco, Desmophen 9225 and Desmophen DE 7652 of Miles, Inc. and Caradol SP 5001 of Shell. Polyol No. 2 preferably has a polyol base similar to that of Polyol No. 1.

Polyol No. 3 can be a 1,000–6,000 M.W. triol (based upon glycerine or trimethylolpropane) with a 40–90% ethylene oxide cap and about 50–90% primary hydroxyl content. Such a polyol can be present in an amount of from about 1 to about 5 percent by weight, and preferably in an amount of about 1 to about 3 percent by weight. Commercially available polyols suitable as Polyol No. 3, in addition to Polyol 8334 by Olin Corporation, include GE 1000 by Carpenter Chemical Company and Arcol 1280 by Arco. These polyols are known as cell-openers in the industry. The preferred Polyol No. 3 has a 70% ethylene oxide cap, has 80% primary hydroxyl and has a molecular weight of 1,000–6,000.

The isocyanate utilized in the formulation should have a functionality value of about 2.0–2.7 and, preferably, a functionality value of about 2.2–2.3, and a isocyanate index (NCO/OH ratio) of about 0.75–1.10. It is present in an amount sufficient to react with the triol polyols to form the latex-like polyurethane, and preferably in an amount of from about 30 to about 40 parts by weight of the formulation. The amount will vary depending on the stiffness value desired in the latex-like polyurethane foam to be produced. Diphenyl methane diisocyanate alone or in mixture with its polymeric forms (MDI) is the preferred isocyanate. Other MDI isocyanates which can be used, provided they have the aforementioned functionality values and come within the polyisocyanate index are Lupranate M20S and MM103 of BASF and Mondur CD, ML, MR, MR-2, MR-5, MRS, MRS-2, MRS-4 and MRS-20 of Miles, Inc.

Water is used as the primary blowing agent in the formulation and must be present within the critical range of about 1.5 to about 3.5 parts by weight, with about 2.0 to 2.5 parts by weight being preferred and about 2.25 parts by weight being the most preferred amount.

While pentane is the preferred auxiliary blowing agent, other low boiling point alkanes, such as cyclopentane, hexane and heptane or low boiling point inert liquids such as acetone, CFC's (chloroflourocarbons), HCFC's (hydrochlorofluorocarbons), methylene chloride, etc. can be used as auxiliary blowing agents in the formulation of the invention. The auxiliary blowing agents can be present in amounts of from about 1 to about 20 parts by weight, depending on the stiffness desired in the latex-like polyurethane foam.

The amine catalysts of the formulation are standard amine catalysts widely used to produce polyurethane in the industry and are present in amounts of from about 0.4 to about 1.0 parts by weight, depending upon the stiffness to be imparted to the resulting latex-like polyurethane foam. A-1 is a standard commercial high efficiency catalyst containing 70 weight percent bis (2,2'dimethylaminoethyl) ether in dipropylene glycol sold by Union Carbide Corporation (NIAX amine Catalyst A-1). Dabco 33LV is an amine catalyst containing 33 weight percent triethylenediamine in dipropylene glycol, produced by Air Products and Chemicals, Inc.

Union Carbide Corporation's organic silicone surfactant Y10184 is a clear surfactant having a viscosity at 20° C. of 250 cP and a specific gravity at 25/25° C. of 1.0050 and a flash point of 108° F. (42° C.). Union Carbide's L-5770 is an alkyl-pendant organosilicone surfactant which can also be used in the formulation of the invention.

With respect to some of the ingredients listed above and identified by trademarks and manufacturers, the following is a further identification of such ingredients:

Lupranate M-10 of BASF Corporation is a solvent-free polymethylene polyphenylisocyanate with a functionality of about 2.2.

Lupranate M-20S is similar to Lupranate M-10, but has a functionality of 2.7.

Lupranate MM-103 is a liquid, solvent-free carbodiimide modified 4,4'diphenyl-methane diisocyanate.

Mondur ML is an isomer mixture of diphenylmethane diisocyanate.

Mondur CD is similar to Mondur MM103.

Mondur MRS-20 is identified by the chemical name isocyanic acid, polymethylene polyphenylene ester by Miles, Inc.

Variations and modifications of the invention will become apparent to those skilled in the art from the foregoing and are intended to be encompassed by the claims appended hereto.

We claim:

1. A flexible, polyurethane foam suitable for applications where latex is used and having an Indentation Force Deflection (25% IFD) of about 3 lbs. formed by a process comprising reacting:
   a) 80 parts by weight of glycerine-based polyol having a molecular weight of about 6,000, a high primary hydroxyl content of about 75% and about 15% ethylene oxide cap;
   b) 20 parts by weight of a triol polyol containing 22.5% by weight of a styrene-acrylonitrile copolymer dispersed in the continuous phase of said polyol;
   c) 2 parts by weight of a glycerine-based polyol having a primary hydroxyl content of about 60% and about 70% ethylene oxide cap;
   d) 32 parts by weight of a polymeric MDI (diphenyl methane diisocyanate) having a functionality of about 2.2 and a NCO content of about 32 weight % and an isocyanate index of about 0.80;
   e) 2.2 parts by weight of water;
   f) 15 parts by weight of pentane; and
   g) an amine catalyst.

2. The polyurethane foam according to claim 1, wherein said polyurethane foam is produced by a process consisting essentially of reacting:
   a) 80 parts by weight of glycerine-based polyol having a molecular weight of about 6,000, a high primary hydroxyl content of about 75% and about 15% ethylene oxide cap;
   b) 20 parts by weight of a triol polyol containing 22.5% by weight of a styrene-acrylonitrile copolymer dispersed in the continuous phase of said polyol;
   c) 2 parts by weight of a glycerine-based polyol having a primary hydroxyl content of about 60% and about 70% ethylene oxide cap;
   d) 32 parts by weight of a polymeric MDI (diphenyl methane diisocyanate) having a functionality of about 2.2 and a NCO content of about 32 weight % and an isocyanate index of about 0.80;
   e) 2.2 parts by weight of water;
   f) 15 parts by weight of pentane; and
   g) an amine catalyst.

3. A flexible polyurethane foam suitable for applications where latex is used and having an Indentation Force Deflection (25% IFD) of about 5 lbs. formed by a process comprising reacting:
   a) 80 parts by weight of glycerine-based polyol having a molecular weight of about 6,000, a high primary hydroxyl content of about 75% and about 15% ethylene oxide cap;
   b) 20 parts by weight of a triol polyol containing 22.5% by weight of a styrene-acrylonitrile copolymer dispersed in the continuous phase of said polyol;
   c) 2 parts by weight of a glycerine-based polyol having a primary hydroxyl content of about 60% and about 70% ethylene oxide cap;
   d) 32 parts by weight of a polymeric MDI (diphenyl methane diisocyanate) having a functionality of about 2.2 and a NCO content of about 32 weight % and an isocyanate index of about 0.80;
   e) 2.2 parts by weight of water;
   f) 10 parts by weight of pentane; and
   g) an amine catalyst.

4. The polyurethane foam according to claim 3, wherein said polyurethane foam is produced by a process consisting essentially of reacting:
   a) 80 parts by weight of glycerine-based polyol having a molecular weight of about 6,000, a high primary hydroxyl content of about 75% and about 15% ethylene oxide cap;
   b) 20 parts by weight of a triol polyol containing 22.5% by weight of a styrene-acrylonitrile copolymer dispersed in the continuous phase of said polyol;
   c) 2 parts by weight of a glycerine-based polyol having a primary hydroxyl content of about 60% and about 70% ethylene oxide cap;
   d) 32 parts by weight of a polymeric MDI (diphenyl methane diisocyanate) having a functionality of about 2.2 and a NCO content of about 32 weight % and an isocyanate index of about 0.80;
   e) 2.2 parts by weight of water;
   f) 10 parts by weight of pentane; and
   g) an amine catalyst.

5. A flexible polyurethane foam suitable for applications where latex is used and having an Indentation Force Deflection (25% IFD) of about 11 lbs. formed by a process comprising reacting:
   a) 80 parts by weight of glycerine-based polyol having a molecular weight of about 6,000, a high primary hydroxyl content of about 75% and about 15% ethylene oxide cap;
   b) 20 parts by weight of a triol polyol containing 22.5% by weight of a styrene-acrylonitrile copolymer dispersed in the continuous phase of said polyol;
   c) 2 parts by weight of a glycerine-based polyol having a primary hydroxyl content of about 60% and about 70% ethylene oxide cap;
   d) 32 parts by weight of a polymeric MDI (diphenyl methane diisocyanate) having a functionality of about 2.2 and a NCO content of about 32 weight % and an isocyanate index of about 0.80;
   e) 2.2 parts by weight of water;
   f) 5 parts by weight of pentane; and
   g) an amine catalyst.

6. The polyurethane foam according to claim 5, wherein said polyurethane foam is produced by a process consisting essentially of reacting:
  a) 80 parts by weight of glycerine-based polyol having a molecular weight of about 6,000, a high primary hydroxyl content of about 75% and about 15% ethylene oxide cap;
  b) 20 parts by weight of a triol polyol containing 22.5% by weight of a styrene-acrylonitrile copolymer dispersed in the continuous phase of said polyol;
  c) 2 parts by weight of a glycerine-based polyol having a primary hydroxyl content of about 60% and about 70% ethylene oxide cap;
  d) 32 parts by weight of a polymeric MDI (diphenyl methane diisocyanate) having a functionality of about 2.2 and a NCO content of about 32 weight % and an isocyanate index of about 0.80;
  e) 2.2 parts by weight of water;
  f) 5 parts by weight of pentane; and
  g) an amine catalyst.

* * * * *